(12) United States Patent
Luo et al.

(10) Patent No.: US 8,933,669 B2
(45) Date of Patent: Jan. 13, 2015

(54) RECLAIMING ENERGY STORED IN RECHARGEABLE BATTERIES FOR CHARGING OTHER BATTERIES

(71) Applicants: Peak Power & Mfg., Inc., Wellington, FL (US); Easy Field Corporation, Jhongli (TW)

(72) Inventors: Chieh Luo, Palm Beach Gardens, FL (US); Derek Justin Goldberg, Wellington, FL (US)

(73) Assignees: Peak Power & Mfg., Inc., Lake Park, FL (US); Easy Field Corporation, Jhongli (TW)

( * ) Notice: Subject to any disclaimer, the term of this patent is extended or adjusted under 35 U.S.C. 154(b) by 317 days.

(21) Appl. No.: 13/672,483

(22) Filed: Nov. 8, 2012

(65) Prior Publication Data

US 2014/0125270 A1    May 8, 2014

(51) Int. Cl.
*H02J 7/00*    (2006.01)

(52) U.S. Cl.
CPC .................................... *H02J 7/0054* (2013.01)
USPC ............ 320/132; 320/136; 320/152; 320/157

(58) Field of Classification Search
CPC ........................................................ Y02E 60/12
USPC ...................................................... 320/132
See application file for complete search history.

(56) References Cited

U.S. PATENT DOCUMENTS

| 5,666,006 | A  | 9/1997 | Townsley et al. |
| 6,518,726 | B1 | 2/2003 | Nowlin, Jr. et al. |
| 2008/0169785 | A1 | 7/2008 | Kim |

*Primary Examiner* — Edward Tso
*Assistant Examiner* — Ahmed Omar

(57) ABSTRACT

One embodiment includes a computer (102) controlled machine used in battery manufacturing and/or testing which discharges one or more batteries and uses some or all of the energy from said batteries to simultaneously charge one or more other batteries.

1 Claim, 4 Drawing Sheets

RECLAIMING ENERGY STORED IN RECHARGEABLE BATTERIES FOR CHARGING OTHER BATTERIES

BACKGROUND

Prior Art

Figure 1:
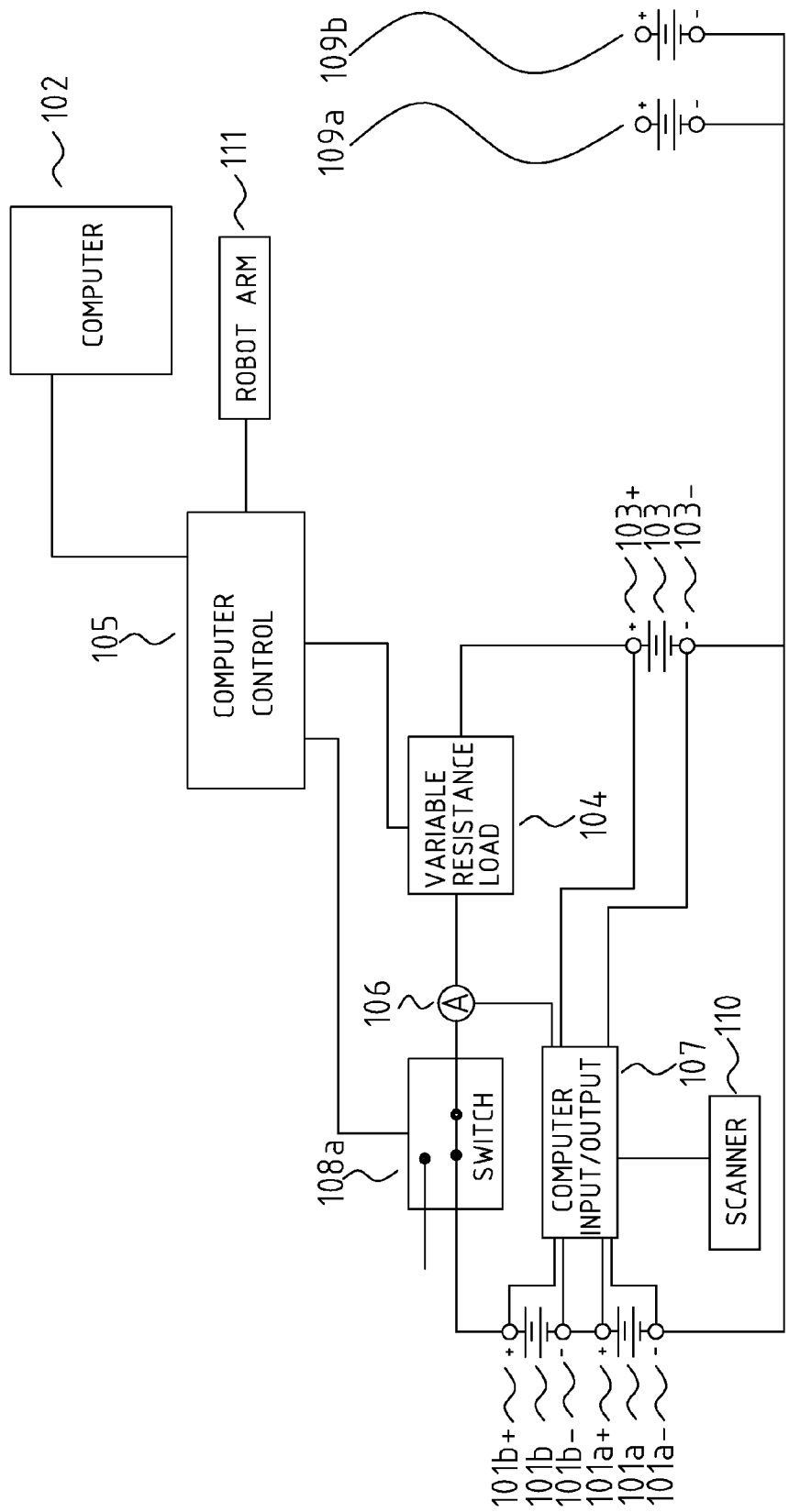

The following is a tabulation of some prior art that presently appears relevant:

| US Patents | | | |
|---|---|---|---|
| Pat. No. | Kind Code | Issue Date | Patentee |
| 0,169,785 | A1 | Jul. 17, 2008 | Bongyoung Kim, Yongin-si |
| 6,518,726 | B1 | Feb. 11, 2003 | Ronald D. Nowlin, Jr. et al. |
| 5,666,006 | A | Sep. 09, 1997 | David B. Townsley et al. |

BACKGROUND OF THE INVENTION AND PROBLEMS TO PREVIOUS APPROACHES

Certain types of a battery, such as a large lithium polymer or a large lithium ion phosphate battery used in an electric automotive vehicle application, may have a manufacturing process which includes charging the battery and at a later time discharging the battery. This cycling may be done in part or in full more than one time. This charging, storage, and discharging the battery may be done to test the battery, to store energy, to release energy, to help in the forming of the battery, or for other reasons.

Traditionally, charging the battery in its manufacturing process is accomplished using an electronic battery charger which converts power from the AC power mains to a DC form readily useable by the battery. The battery is traditionally charged alone or with one or more batteries in series, parallel, or in a series/parallel combination.

Likewise, the battery discharge in its manufacturing process is typically accomplished by connecting the battery to a resistive load. The battery is traditionally discharged by itself or with one or more batteries in series, parallel, or in a series/parallel combination.

Traditionally, the charging of one battery and the discharging of a different battery in the battery manufacturing process is performed independent of each other.

Each time the discharged battery is charged using the electronic battery charger, the electronic battery charger typically converts power from the available AC mains into the DC form required by the battery. This AC power consumed incurs a cost to the manufacturing facility.

Each time the battery is discharged into an active or passive resistive load, the energy stored in the battery is converted to heat. This heat is often unwanted in the manufacturing area and removed by the manufacturing facility's cooling systems. This additional cooling requirement incurs a cost to the manufacturing facility.

Traditionally, a lithium polymer or lithium ion phosphate battery for automotive electric vehicle applications is charged and discharged along with other batteries in series and/or in parallel during the manufacturing process. A failure of a battery is often not detected until after the charging or discharging cycle is complete and the battery is connected to a test station. Where the failed battery had been charged in series with other batteries, the entire string of batteries being charged often needed to repeat the charging cycle again.

SUMMARY

In accordance with one embodiment: the energy for charging a lithium polymer or a lithium ion phosphate battery during the manufacturing process of said battery will be partly or fully provided by other batteries which are being discharged during their manufacturing process, the process of charging one battery and concurrently discharging one or more different batteries speeds-up testing through-put when compared to sequential manufacturing, energy from the AC mains that has been used to charge a battery may be partly recycled and used to charge one or more other batteries, the energy consumption from the AC mains to cool the manufacturing facility may be reduced, and each battery may be monitored during charging/discharging and replaced in real time if a problem is detected.

DRAWINGS

Figures

Figure 2:
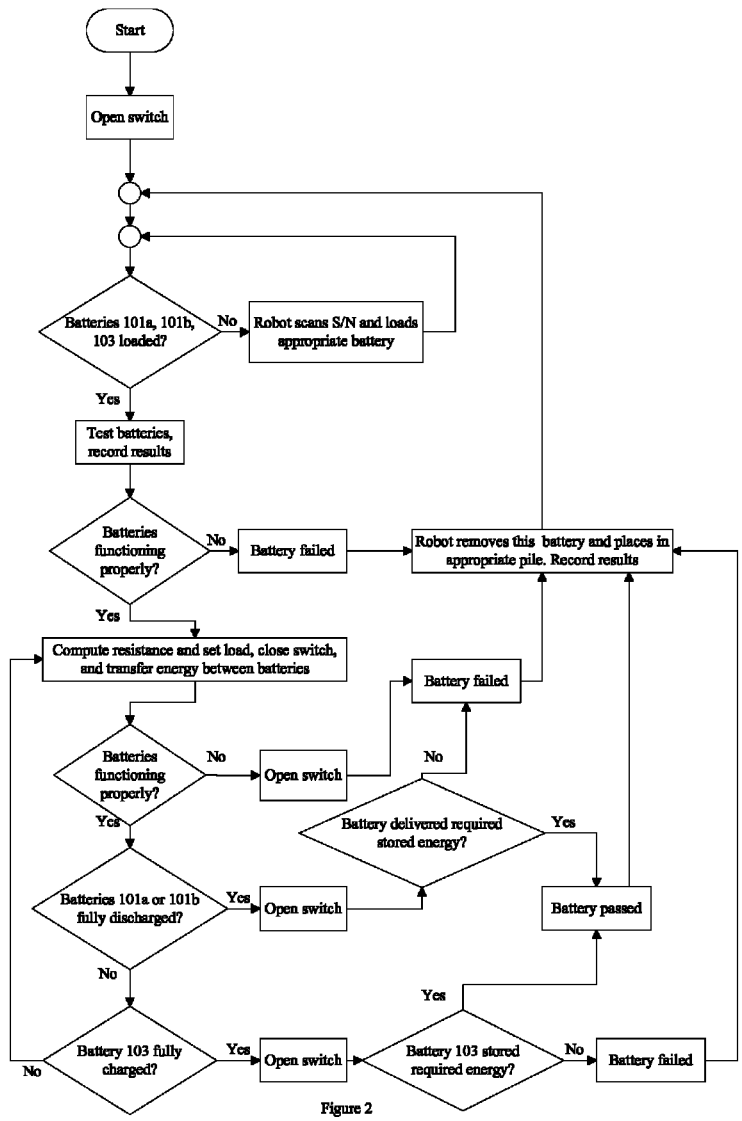
Figure 3:
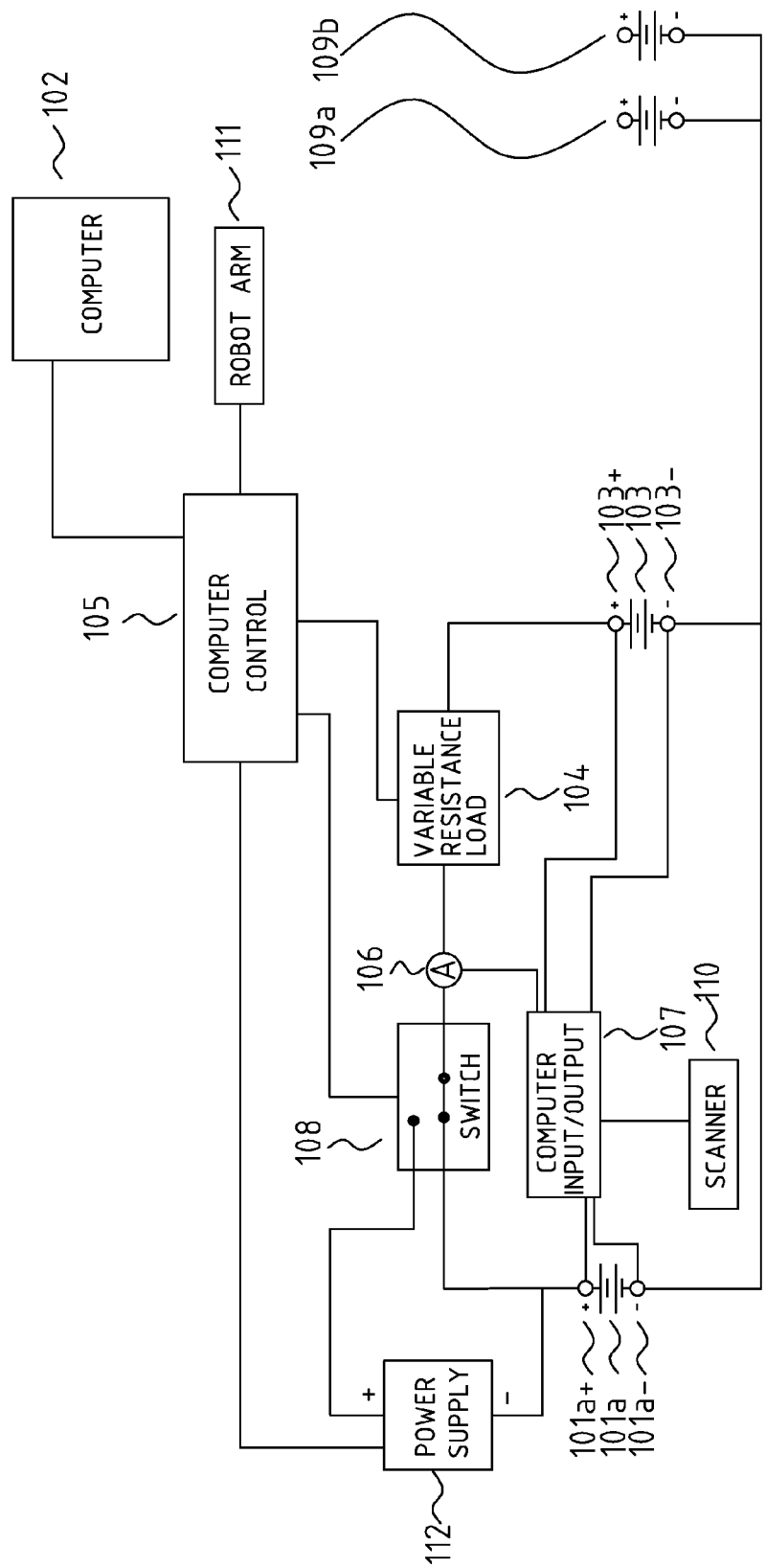
Figure 4:
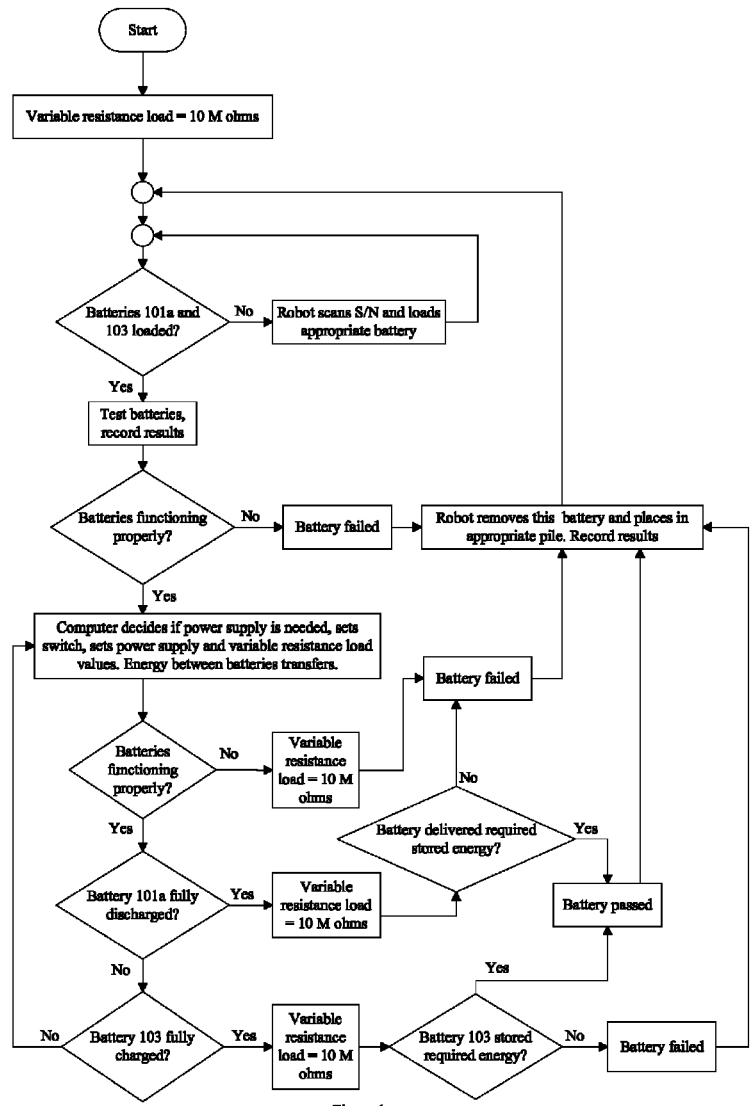

FIG. 1 is a circuit diagram of the first embodiment
FIG. 2 is a system flowchart outlining an example machine using the first embodiment
FIG. 3 is a circuit diagram of alternative embodiment
FIG. 4 is a system flowchart outlining an example machine using the alternative embodiment

DRAWINGS

Reference Numerals

101a initially charged battery
101a− negative terminal of initially charged battery
101a+ positive terminal of initially charged battery
101b initially charged battery
101b− negative terminal of initially charged battery
101b+ positive terminal of initially charged battery
102 computer
103 initially uncharged or discharged battery
103− negative terminal of initially uncharged or discharged battery
103+ positive terminal of initially uncharged or discharged battery
104 variable resistance load
105 computer control
106 ammeter, represented in FIG. 1 by an encircled "A"
107 computer inputs/outputs to measure and control circuit parameters
108 switch
109a initially charged battery
109b initially uncharged or discharged battery
110 scanner for recording battery serial numbers
111 robot for moving batteries
112 DC power supply

DETAILED DESCRIPTION

FIGS. 1 and 2—First Embodiment

One embodiment is illustrated in FIG. 1 which shows the circuit diagram of a battery charging, discharging, and testing machine for use in battery manufacturing and which may be used specifically with the type of lithium ion phosphate batteries that power electric vehicles. In this example circuit, an initially charged battery 101a, which has a negative terminal 101a− and a positive terminal 101a+, is on the bottom and an initially charged battery 101b, which has a negative terminal 101b− and a positive terminal 101b+, is on the top of this series connected pair. The positive terminal of the top battery 101b+ is connected through a switch 108 to an ammeter 106 which is represented in FIG. 1 by an encircled "A", through a variable resistance load 104, and into a positive terminal 103+ of an initially discharged or uncharged battery 103. A negative terminal 103− of this initially discharged or uncharged battery 103 is connected to the negative terminal 101a− of the charged battery 101a, completing the circuit.

The switch 108 can be set to one of two possible positions by a computer control 105. Alternatively to the aforementioned connection, the switch 108 could be placed in an open configuration where it disconnects the initially charged battery 101b from the ammeter 106.

In addition to controlling the switch 108, the computer control 105 also controls the variable resistance load 104. A computer inputs/outputs 107 connects to and performs measurements (including voltage readings) on all battery terminals as well as the ammeter 106.

An additional initially charged battery 109a and an additional initially discharged or uncharged battery 109b are present but are not connected to the circuit. A bar code scanner 110 for identifying each battery is also attached to the computer inputs/outputs 107, and a robot 111 is connected to the computer control 105. The computer control 105 and the computer inputs/outputs 107 are some of the interfaces to a computer 102.

Operation

The machine in FIG. 1 follows the machine flowchart of FIG. 2. The switch 108 is set to open circuit. The initially charged battery 101a on the bottom and the initially charged battery 101b at the top of the series batteries are installed along with the initially uncharged or discharged battery 103 into the machine's circuit via the robot 111 which concurrently uses the scanner 110 to read the serial numbers of the batteries as they are being installed. This serial number data enters the computer inputs/outputs 107 and is recorded in a file on the computer 102. In order to continue in their manufacture process, battery 103 must be charged and batteries 101a and 101b must be discharged. These three batteries are assembled into the circuit of FIG. 1 as shown. The computer inputs/outputs 107 measures and/or performs tests on these three batteries individually. This data is recorded in the file with the respective battery's individual serial number.

The computer 102 analyzes the collected data from the battery measurements and determines if the batteries are functioning properly. If not, the failed battery is removed by the robot 111 and placed in an appropriate pile, the results are recorded with the battery's serial number on the computer 102, and an appropriate replacement battery is loaded into the circuit. If the batteries are properly functioning, the computer 102 determines the appropriate resistance—based on measured battery voltages and an algorithm—and sets the variable resistance load 104. It closes the switch 108 and discharging of the initially charged batteries 101a and 101b into the initially uncharged or discharged battery 103 begins.

The computer inputs/outputs 107 continue to monitor the batteries and the computer 102 determines if they are properly functioning. If a problem is detected, the switch 108 is opened and the failed battery is removed by the robot 111 and placed in an appropriate pile, the results are recorded with the battery's serial number on the computer 102, and an appropriate replacement battery is loaded into the circuit.

The computer 102 next determines if either of the initially charged batteries 101a and 101b is fully discharged. If one is, the switch 108 is opened. The computer 102 next determines if the discharged battery delivered the required stored energy. If so, the battery passes, is removed by the robot 111 and placed in an appropriate pile, the results are recorded with the battery's serial number on the computer 102, and an appropriate replacement battery 109a is loaded into the circuit. If the discharged battery did not deliver the required stored energy, the battery fails and is removed by the robot 111 and placed in an appropriate pile, the results are recorded with the battery's serial number on the computer 102, and an appropriate replacement battery 109a is loaded into the circuit.

The computer 102 next determines if the initially uncharged or discharged battery 103 is fully charged. If it is, the switch 108 is opened. The computer 102 next determines if the charged battery 103 received the required stored energy. If so, the battery 103 passes, is removed by the robot 111 and placed in an appropriate pile, the results are recorded with the battery's serial number on the computer 102, and an appropriate replacement battery 109b is loaded into the circuit. If the charged battery 103 did not receive the required stored energy, the battery 103 fails and is removed by the robot 111 and placed in an appropriate pile, the results are recorded with the battery's serial number on the computer 102, and an appropriate replacement battery 109b is loaded into the circuit.

Detailed Description

FIGS. 3 and 4—of Alternative Embodiment

As shown in the circuit diagram of FIG. 3, this alternative embodiment utilizes a DC power supply 112 whose positive output is connected to the previously open side of the switch 108 and whose negative output is connected to the positive terminal 101a+ of the battery 101a to be discharged. Additionally, the DC power supply 112 is controlled by the computer control 105.

Operation of Alternative Embodiment

The system in FIG. 3 follows the flowchart of FIG. 4. It is very similar to the embodiment previously discussed except: (1) the variable resistance load 104 is also used to mimic the behavior of a switch in the open circuit position by programming its resistance to over 10 mega-ohms, (2) there is only one initially charged battery 101a, (3) a power supply has been added in series with the initially charged battery 101a via the switch 108 to insure the battery 101a voltage can be boosted to a higher potential than the initially discharged battery 103 during the entire energy transfer cycle, insuring all the energy from the initially charged battery 101a will be transferred.

This embodiment has the advantage of potentially transferring energy between the batteries more efficiently. When the initially charged battery 101a is significantly higher in voltage than the initially uncharged or discharged battery 103, the DC power supply 112 is bypassed by the switch 108. When the computer 102 determines the battery voltages are insufficient to properly transfer energy in the proper direction between the said batteries, the DC power supply 112 is utilized to force the energy transfer.

Advantages

From the description above, a number of advantages of these embodiments become evident:

(a) By discharging a group of charged batteries into a group of discharged batteries, part of the energy stored in the first group is transferred into the second group, thus eliminating the need and cost of converting energy from the AC mains for use in charging the discharged batteries.

(b) By discharging a group of charged batteries into a group of discharged batteries, cooling costs for the manufacturing facility may be reduced as all of the energy stored in the second group of batteries would typically have been converted into heat during the battery discharge process of the first group.

(c) The concurrent nature of discharging a group of charged batteries into a group of discharged batteries reduces the time which would be required for manufacturing equipment to discharge a group of charged batteries and then charge a group of discharged batteries sequentially.

(d) By repeatedly testing each battery during its charging or discharging cycle, a battery failure can often be found prior to testing the batteries at the completion of the cycle, thus enabling the failed batteries in the string to be replaced and saving the time and energy which would be required to repeat the charging or discharging cycle for these other batteries in the circuit.

(e) By serializing the batteries and automating their movement through this charging, storage, and discharging circuit through the use of the scanner, robot, and computer, human errors in sorting the batteries are reduced or eliminated and the process can be expedited.

(f) The automation of the calculations by the computer in determining if the appropriate amount of energy was removed or stored into the battery will further reduce human errors in determining if each battery is properly functioning.

(g) By expanding the number of batteries being discharged by adding more batteries in series or in parallel and by expanding the number of batteries being charged by adding more batteries in series or in parallel in FIG. 1, along with their associated interconnections and software, the volume of batteries which can concurrently be processed in a single machine can be increased. Obviously, the voltage on the batteries being discharged must always be higher than the voltage on the batteries being charged.

CONCLUSIONS, RAMIFICATIONS, AND SCOPE

Thus the reader will see that at least one embodiment of our machine for reclaiming energy stored in rechargeable batteries for charging other batteries during the batteries manufacturing process provides a more energy efficient, faster throughput, and more reliable process than that currently in use.

While my above descriptions contain many specificities, these should not be construed as limitations on the scope, but rather as an exemplification of some embodiments thereof. Many other variations are possible.

Accordingly, the scope should be determined not by the embodiments illustrated, but by the appended claims and their legal equivalents.

The invention claimed is:

1. A machine used for manufacturing and/or testing batteries, comprising:
   a. a robot for moving said batteries into and out of said machine,
   b. an energy source or multiple energy sources for charging the initially uncharged or discharged battery or batteries, where said energy source or sources includes a charged battery,
   c. an energy sink or multiple energy sinks for discharging the initially charged battery or batteries, where said energy sink or sinks includes the initially uncharged or discharged battery,
   d. a load for controlling the current flow between said sources and sinks,
   e. monitoring terminal voltages of said batteries during said charging and said discharging,
   f. a computer for coordinating and controlling said machine and for monitoring and tracking said batteries,
   g. a circuit enabling transfer of energy between said discharged or uncharged battery or batteries to said charged battery or batteries such that said discharged battery or batteries gets charged and said initially charged battery or batteries gets discharged,
   whereby some or all of said energy stored in one or more of said initially charged batteries is partly or fully moved to one or more of said initially uncharged or discharged batteries and thereby reducing the energy required to charge said initially uncharged or discharged batteries and the energy required to cool said energy sinks if the environment where said energy sinks are located require cooling.

* * * * *